(12) United States Patent
Chen et al.

(10) Patent No.: US 7,545,635 B2
(45) Date of Patent: Jun. 9, 2009

(54) COVERING APPARATUS FOR EXPANSION SLOT

(75) Inventors: Ming-Ke Chen, Shenzhen (CN); Ke Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 37 days.

(21) Appl. No.: 11/930,168

(22) Filed: Oct. 31, 2007

(65) Prior Publication Data
US 2008/0137283 A1 Jun. 12, 2008

(30) Foreign Application Priority Data
Dec. 8, 2006 (CN) .................. 2006 2 0201008 U

(51) Int. Cl.
*H05K 5/02* (2006.01)
(52) U.S. Cl. .................. 361/683; 166/298; 710/301

(58) Field of Classification Search .............. 166/387, 166/298, 208; 404/47; 710/300, 301, 313; 312/223.1, 223.2; 361/679–687, 724–727
See application file for complete search history.

(56) References Cited

U.S. PATENT DOCUMENTS

| 5,923,534 | A | * | 7/1999 | Yajima | 361/737 |
| 5,967,337 | A | * | 10/1999 | Fitzburgh | 211/40 |
| 6,101,322 | A | * | 8/2000 | Goodrum et al. | 710/302 |

* cited by examiner

*Primary Examiner*—Hung V Duong
(74) *Attorney, Agent, or Firm*—Frank R. Niranjan

(57) ABSTRACT

A covering apparatus for covering an expansion slot of a rear panel of a computer enclosure, includes a receiving box mounted to the rear panel at a first end of the expansion slot, and an extendable cover received in the receiving box. The cover has a covering body configured for covering the expansion slot, a securing end at one end of the covering body for being secured to the receiving box, and an extension end at an opposite end of the covering body for being extended out and secured to the rear panel at a second end of the expansion slot opposite to the first end to retain the covering body covering the expansion slot.

18 Claims, 7 Drawing Sheets

COVERING APPARATUS FOR EXPANSION SLOT

BACKGROUND

1. Field of the Invention

The present invention relates to covering apparatuses, and particularly to a covering apparatus for covering an expansion slot of a computer enclosure.

2. Description of Related Art

In order to upgrade the operating capabilities of a personal computer, a plurality of expansion cards is operatively installed in an enclosure of the personal computer. The expansion cards include network cards, sound cards, graphics accelerator cards, multi-media cards and etc. The expansion cards may be installed in the enclosure during manufacturing or by the computer purchaser after manufacture.

A plurality of slots is defined in a rear panel of the enclosure for mounting expansion cards. A plurality of covers is attached to the rear panel to cover the slots for shielding against electromagnetic interference when the expansion cards are not mounted. Traditionally, each cover is L-shaped and has an elongated portion and a bent portion perpendicularly extending from the elongated portion. The elongated portion covers a corresponding slot, and the bent portion is mounted to the rear panel. When an expansion card needs to be used and mounted to the rear panel, the cover is removed and generally disposed of. Thus the cover is not usable again.

What is needed is to provide a convenient reusable covering apparatus for covering an expansion slot of a computer enclosure.

SUMMARY

In one embodiment, a covering apparatus for covering an expansion slot of a rear panel of a computer enclosure, includes a receiving box mounted to the rear panel at a first end of the expansion slot, and an extendable cover received in the receiving box. The cover has a covering body configured for covering the expansion slot, a securing end at one end of the covering body for being secured to the receiving box, and an extension end at an opposite end of the covering body for being extended out and secured to the rear panel at a second end of the expansion slot opposite to the first end to retain the covering body covering the expansion slot.

Other advantages and novel features of the present invention will become more apparent from the following detailed description of an embodiment when taken in conjunction with the accompanying drawings, in which:

DETAILED DESCRIPTION

Figure 1:
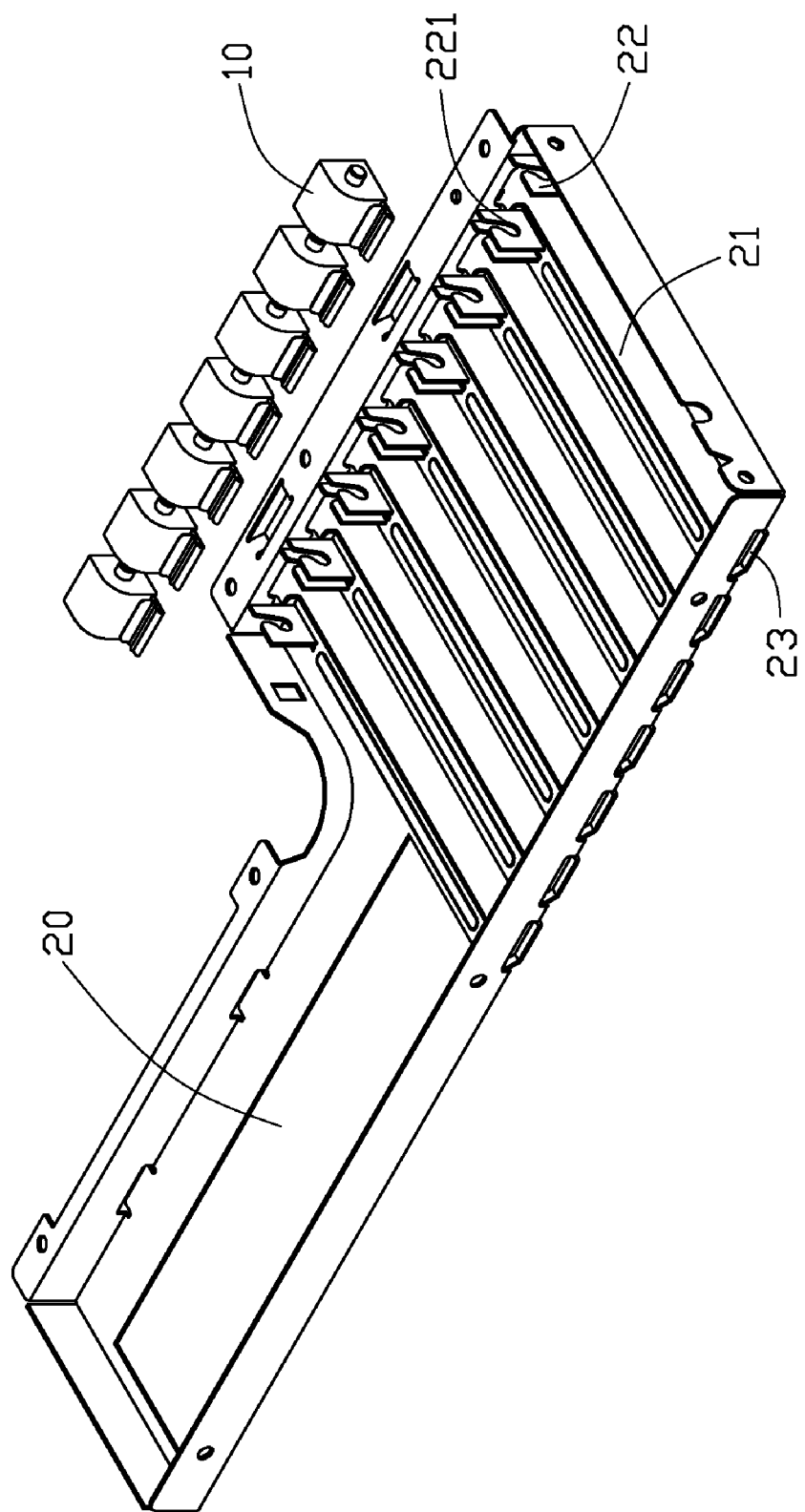
FIG. 1 is an exploded, isometric view of a plurality of covering apparatuses for covering expansion card slots in accordance with an embodiment of the present invention, together with a rear panel of a computer enclosure.
Figure 2:
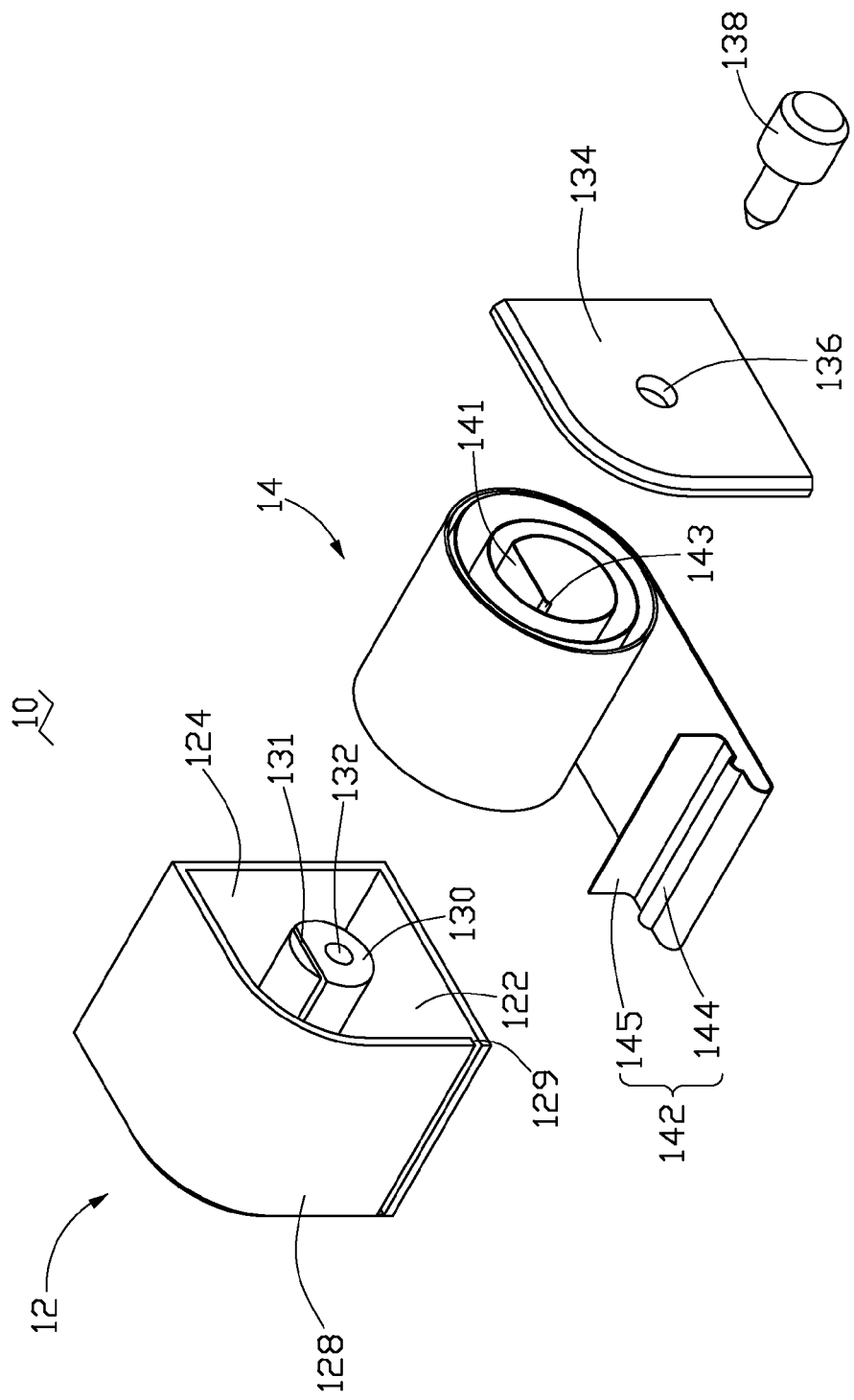
FIG. 2 is an exploded, isometric view of one of the covering apparatuses of FIG. 1 including a plate and a fastener.

Referring to FIGS. 1 and 2, a plurality of covering apparatuses 10 in accordance with an embodiment of the present invention is provided for covering a plurality of expansion slots of a rear panel 20 of a computer enclosure. Each covering apparatus 10 includes a receiving box 12, a resilient roll-up cover 14, a plate 134 with a through hole 136 defined therein, and a fastener 138. In this embodiment, the fastener 138 is a rivet, and has a small end and a large end.

The rear panel 20 defines a plurality of parallel expansion slots 21 therein. Two parallel mounting pieces 22 extend up from the rear panel 20 at opposite sides of an end of each expansion slot 21. A mounting hole 221 is defined in each mounting piece 22. A bent piece perpendicular to the expansion slots 22 extends up from the rear panel 20 at the other ends of the expansion slots 21. A plurality of locking portions 23 is stamped from the bent piece corresponding to the expansion slots 21.

Figure 3:
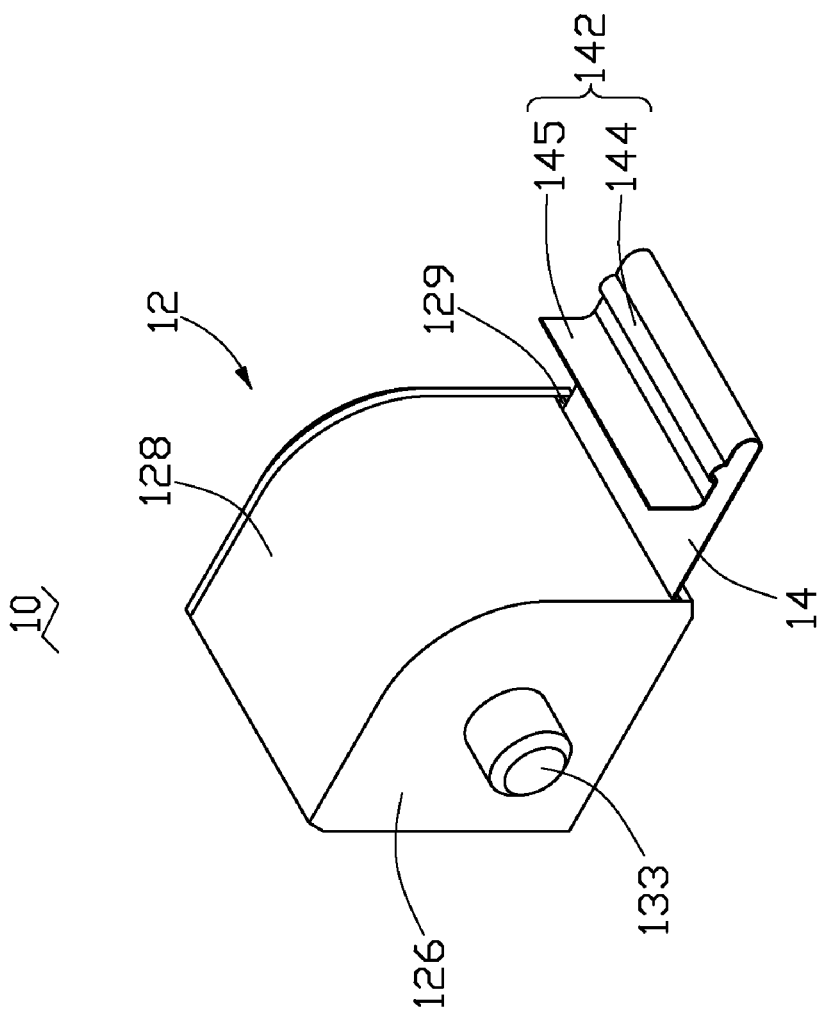
FIG. 3 is an assembled view of FIG. 2, but viewed from another aspect.

Referring also to FIG. 3, the receiving box 12 includes a rectangular bottom wall 122, a first sidewall 124 perpendicularly extending up from one side of the bottom wall 122, a second sidewall 126 perpendicularly extending up from another side of the bottom wall 122 next to the first sidewall 124, and an arc-shaped top wall 128 extending from a top edge of the first sidewall 124 toward and terminating near, an edge of the bottom wall 122 opposite to the first sidewall 124 and connecting to a free edge of the second sidewall 126. An aperture 129 is defined between the distal end of the top wall 128 and the edge of the bottom wall 122. An opening (not labeled) is defined in the receiving box 12 opposite to the second sidewall 126. A bobbin 130 perpendicularly extends from the center of the inner surface of the second sidewall 126 toward the opening. A mounting hole 132 is defined in the bobbin 130 along the axis of the bobbin 130. A slot 131 is defined in the bobbin 130 parallel to the axis of the bobbin 130. A rod 133 extends outward from an outer surface of the second sidewall 126.

The cover 14 includes a covering body (not labeled), a securing end 141 and an extension end 142 at two opposite ends of the covering body. A securing portion 143 extends from the securing end 141. The extension end 142 is generally U-shaped and bent from the corresponding end of the cover 14. A raised portion 144 is formed on a middle portion of one sidewall of the U-shaped extension end 142. An operating member 145 extends up from a free end of the sidewall of the U-shaped extension end 142. In an original state, the cover 14 is resiliently extendable.

Figure 4:
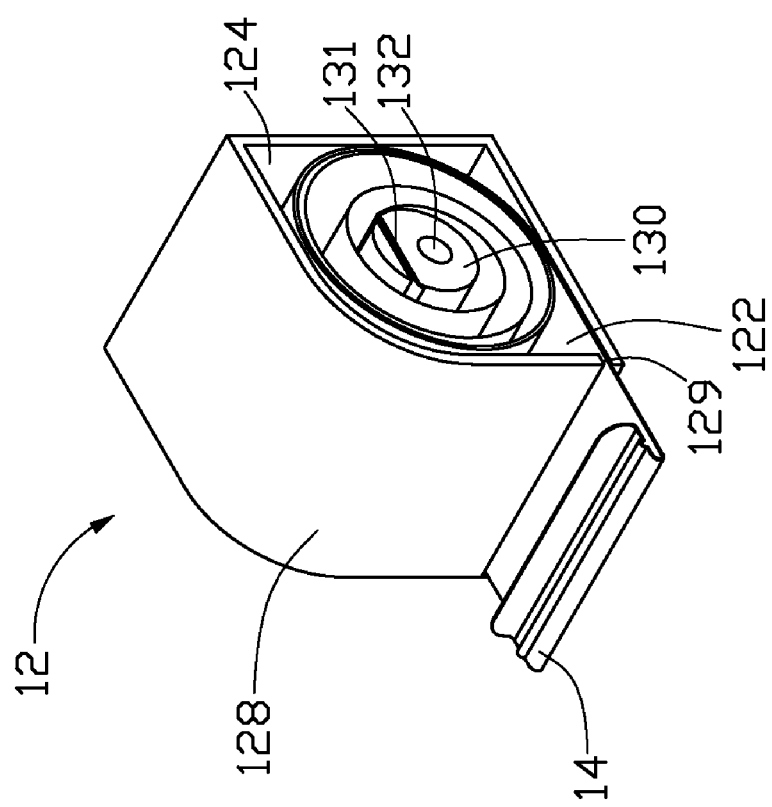
FIG. 4 is a partially assembled view of FIG. 2 without the plate and the fastener.

Referring also to FIG. 4, in assembly, the cover 14 is received in the receiving box 12 around the bobbin 130. The securing end 141 is inserted in the slot 131. The securing portion 143 is held by the outside surface of the bobbin 130. The extension end 142 is outside the receiving box 12, with a portion of the cover 14 adjacent to the extension end 142 extending through the aperture 129 of the receiving box 12. The operating member 145 of the extension end 142 is spaced from the outer surface of the top wall 128 of the receiving box 12. The plate 134 is attached to the receiving box 12 to cover the opening of the receiving box 12. The small end of the fastener 138 extends through the through hole 136 of the plate 134 and received in the mounting hole 132 of the bobbin 130 of the receiving box 12, to fix the plate 134 to the receiving box 12.

Figure 5:
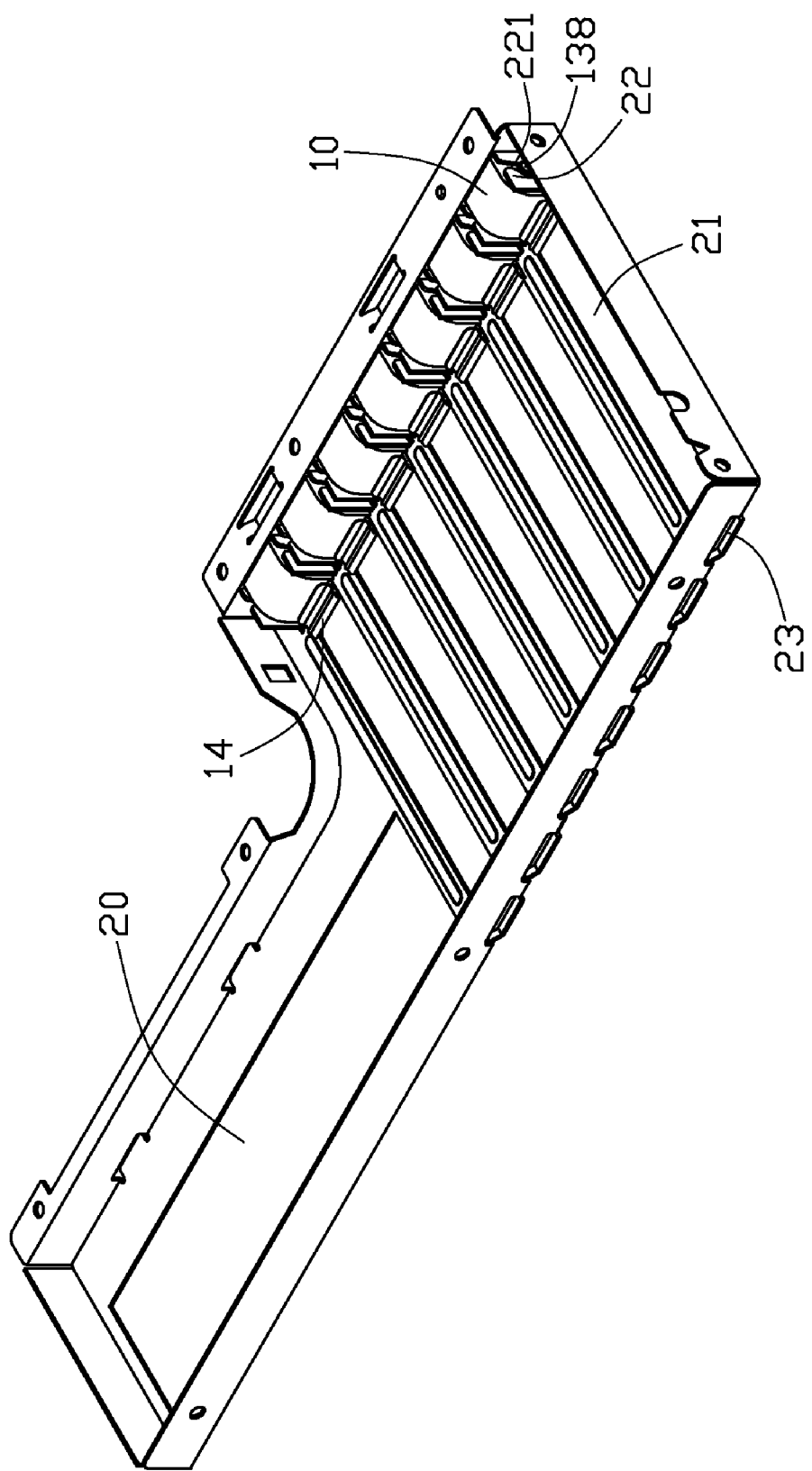
FIG. 5 is an assembled view of FIG. 1.
Figure 6:
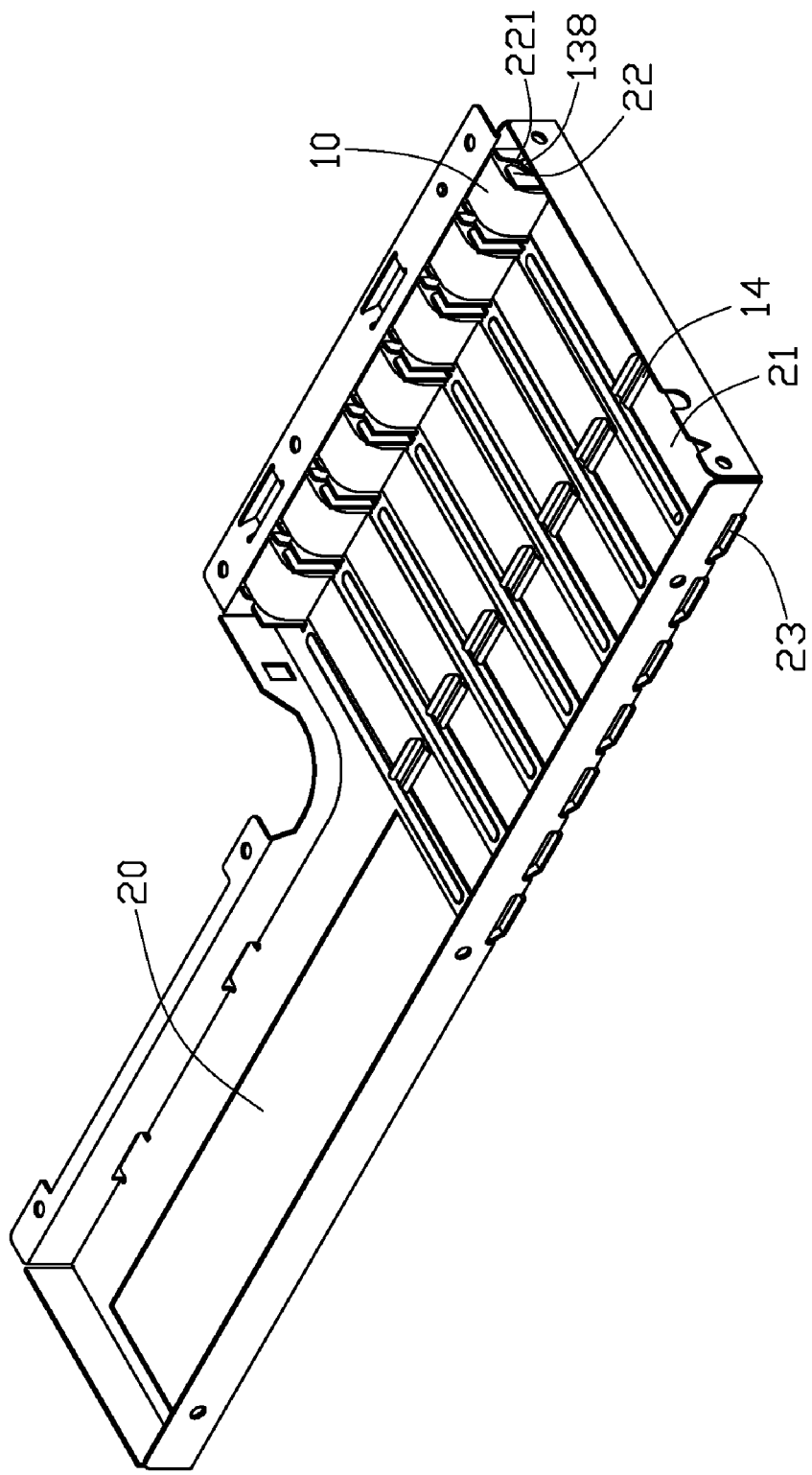
FIGS. 6 and 7 are similar to FIG. 5, but respectively showing two using states.
Figure 7:
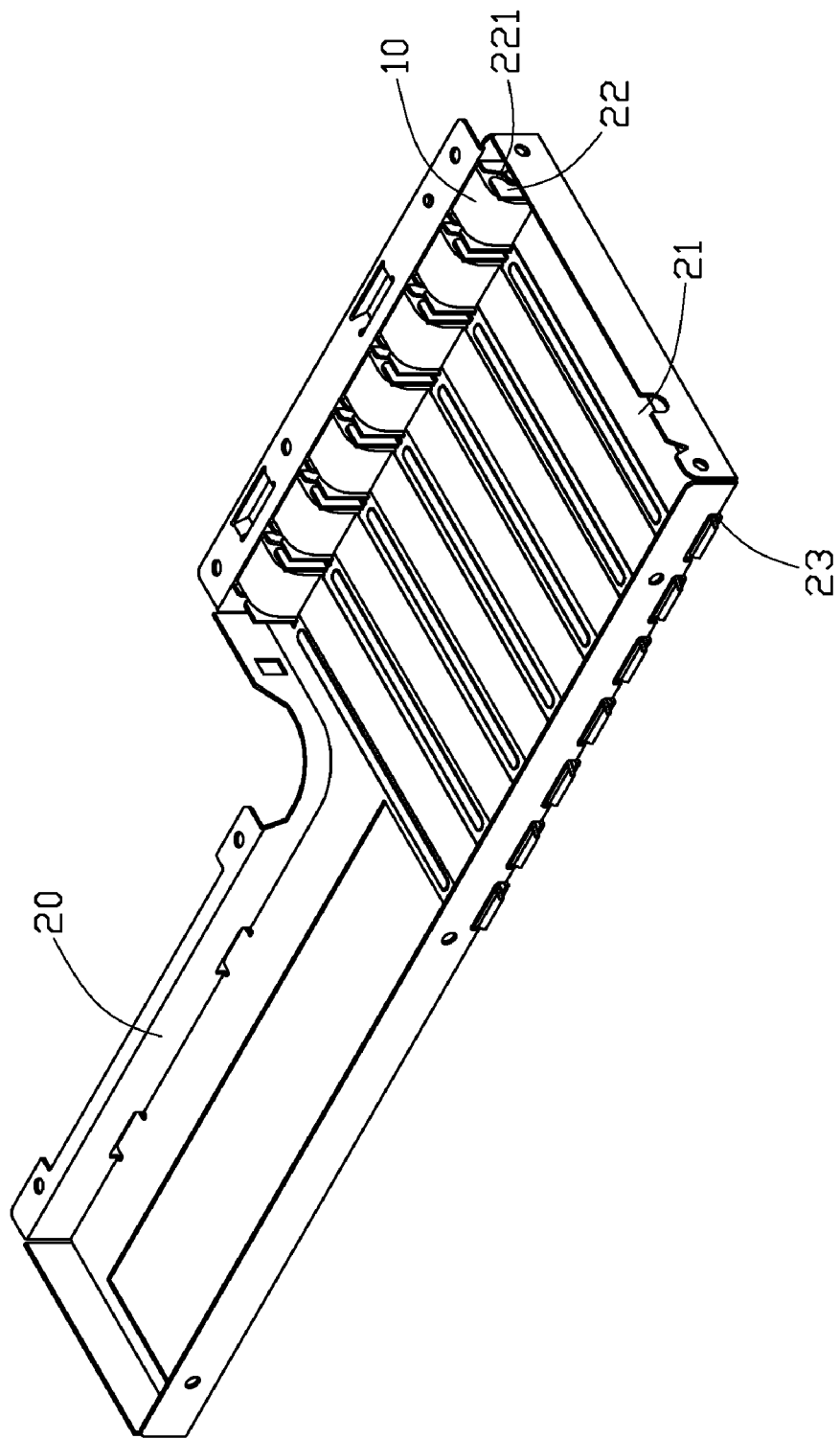

Referring also to FIGS. 5-7, in use, each covering apparatus 10 is mounted to the rear panel 20 via the rod 133 of the receiving box 12 and the large end of the fastener 138 respectively engaging in the mounting holes 221 of the mounting pieces 22 at two sides of a corresponding expansion slot 21 of the rear panel 20. When an expansion slot 21 is not used to mount an expansion card, the covering body of the cover 14 is pulled out to extend to the corresponding locking portion 23 of the rear panel 20 along the expansion slot 21, until the raised portion 144 of the extension end 142 engages with the locking portion 23. Thus, the expansion slot 21 is covered by the cover 14 for shielding from electromagnetic interference. In mounting an expansion card to the computer enclosure, the operating member 145 of a corresponding cover 14 is operated to disengage the raised portion 144 from the locking portion 23. The covering body of the cover 14 is resiliently retracted into the receiving box 12 for exposing the corresponding expansion slot 21. Thus, the expansion card can be mounted.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A covering apparatus for covering an expansion slot of a rear panel of a computer enclosure, comprising:
    a receiving box mounted to the rear panel at a first end of the expansion slot; and
    an extendable cover received in the receiving box, the cover having a covering body configured for covering the expansion slot, a securing end at one end of the covering body for being secured to the receiving box, and an extension end at an opposite end of the covering body for being extended out and secured to the rear panel at a second end of the expansion slot opposite to the first end to retain the covering body covering the expansion slot.

2. The covering apparatus as claimed in claim 1, further comprising a locking portion arranged in the rear panel at the second end of the expansion slot for engaging with the extension end of the cover.

3. The covering apparatus as claimed in claim 2, wherein the receiving box has an opening for the cover passing through to be received therein, a plate is mounted to the receiving box to cover the opening.

4. The covering apparatus as claimed in claim 3, wherein a through hole is defined in the plate, a fastener having a small end and a large end extends through the through hole and screws in the receiving box.

5. The covering apparatus as claimed in claim 4, wherein a rod extends from the receiving box opposing to the plate, the rod and the large end of the fastener configured for engaging with the rear panel.

6. The covering apparatus as claimed in claim 1, wherein a bobbin is formed in the receiving box, a slot is defined in the bobbin parallel to the axis of the bobbin, the cover is received in the receiving box with the covering body coiling around the bobbin, the securing end of the cover is inserted in the slot.

7. The covering apparatus as claimed in claim 6, wherein a securing portion extends slantedly from the securing end, the securing portion is blocked by the circumference of the bobbin.

8. The covering apparatus as claimed in claim 6, wherein the covering body of the cover is resiliently extendable.

9. The covering apparatus as claimed in claim 8, wherein the extension end of the cover is generally U-shaped.

10. The covering apparatus as claimed in claim 9, wherein a raised portion is formed on a middle portion of one sidewall of the U-shaped extension end configured for locking the extension end of the cover to the rear panel.

11. The covering apparatus as claimed in claim 10, wherein an operating member extends from a free end of the sidewall of the U-shaped extension end for facilitating manual operation.

12. The covering apparatus as claimed in claim 10, wherein an aperture is defined in the receiving box for the covering body of the cover extending therethrough.

13. An assembly comprising:
    a rear panel of an electronic device, defining an expansion slot therein, a mounting piece and a locking portion formed on the rear panel at opposite ends of the expansion slot; and
    a covering apparatus comprising a receiving box mounted to the mounting piece of the rear panel, and an extendable cover coiledly received in the receiving box, the cover having a covering body for covering the expansion slot, a securing end at one end of the covering body secured to the receiving box, and an extension end at an opposite end of the covering body configured to engage with the locking portion of the rear panel when the covering body is extended out of the receiving box to cover the expansion slot.

14. The assembly as claimed in claim 13, wherein the receiving box comprises a bottom wall, a first sidewall extending up from one side of the bottom wall, a second sidewall extending up from another side of the bottom wall next to the first sidewall, a top wall extending from a top edge of the first sidewall toward a side of the bottom wall opposite to the first sidewall and connecting to a free edge of the second sidewall, the bottom wall, first sidewall, second sidewall, and top wall cooperatively form a space, an opening is defined in the receiving box opposite to the second sidewall for the cover passing through to be received in the space of the receiving box, a bobbin extending from the second sidewall toward the opening for allowing the covering body of the cover circling therearound.

15. The assembly as claimed in claim 14, further comprising a plate with a through hole defined therein for covering the opening of the receiving box, and a fastener extending through the through hole of the plate to screw in the bobbin of the receiving box.

16. The assembly as claimed in claim 14, wherein an aperture is defined between a distal end of the top wall and the corresponding side of the bottom wall opposite to the first sidewall to allow the covering body of the cover passing therethrough.

17. The assembly as claimed in claim 14, wherein a slot is defined in the bobbin parallel to the axis of the bobbin for clamping the securing end of the cover.

18. The assembly as claimed in claim 17, wherein the securing end has a securing portion bent therefrom, and the securing end is received in the slot with the securing portion blocked by the circumference of the bobbin.

* * * * *